United States Patent [19]

Hirsch et al.

[11] Patent Number: 4,722,048

[45] Date of Patent: Jan. 26, 1988

[54] MICROCOMPUTER SYSTEM WITH INDEPENDENT OPERATING SYSTEMS

[75] Inventors: Thomas S. Hirsch, Bedford; James W. Stonier, Chelmsford; Thomas O. Holtey, Newton, all of Mass.

[73] Assignee: Honeywell Bull Inc., Minneapolis, Minn.

[21] Appl. No.: 719,771

[22] Filed: Apr. 3, 1985

[51] Int. Cl.⁴ .............................................. G06F 15/16
[52] U.S. Cl. .................................................. 364/200
[58] Field of Search ... 364/200 MS File, 900 MS File, 364/300

[56] References Cited

U.S. PATENT DOCUMENTS

| | | | |
|---|---|---|---|
| 3,631,405 | 12/1971 | Hoff et al. | 364/200 |
| 4,131,941 | 12/1978 | Siegel et al. | 364/200 |
| 4,200,930 | 4/1980 | Rawlings et al. | 364/200 |
| 4,320,451 | 3/1982 | Bachman et al. | 364/200 |
| 4,380,798 | 4/1983 | Shannon et al. | 364/200 |
| 4,394,725 | 7/1983 | Bienvenu et al. | 364/200 |
| 4,445,197 | 4/1984 | Lorie et al. | 364/200 |
| 4,594,657 | 6/1986 | Byrns | 364/900 |
| 4,644,496 | 2/1987 | Andrews | 364/900 |

Primary Examiner—David Y. Eng
Attorney, Agent, or Firm—Nicholas Prasinos; John S. Solakian

[57] ABSTRACT

A computer system is described wherein two independent processors communicate via a bus system and operate substantially concurrently, each computer having its own operating system software and share a common memory. The architecture of the computer system is such that one of the processors is allocated the bulk of memory band-width with the other processor taking the remainder. Arbitration for memory allocation is accomplished via a combination of a new firmware instruction and a semaphore.

5 Claims, 3 Drawing Figures

MICROCOMPUTER SYSTEM WITH INDEPENDENT OPERATING SYSTEMS

RELATED APPLICATION

The following U.S. applications assigned to the same assignee as the instant application are incorporated by reference:

1. Direct Multiplex Control Facility, having Ser. No. 503,963, filed June 13, 1983.
2. Bridging Facility for Supporting Multiple Operating Systems via a Shell, having Ser. No. 719,772, filed Apr. 3, 1985.

BACKGROUND

1. Field of the Invention

This invention relates generally to computer systems, and more particularly to computer systems having multiple processors, each processor having its own independent operating system.

2. Description of the Prior Art

Traditional von Neumann computers, working in parallel, represent the bulk of multiprocessing architectures to date. In the von Neumann architecture, established about a generation ago, controlled logic routes instructions and data from a common memory to a central processing unit that manipulates the data and sends the results back to memory. In this type of an architecture the limiting factor in processing speed and in diversity of programs that can be handled simultaneously is the central processing unit (CPU). To minimize this difficulty different types of computers have been built employing multiprocessor or multiprogramming architectures that are based on the fundamental von Neumann architecture. The bulk of these multiprocessor architectures utilize multiple CPUs, working in parallel, to apply multiple instruction streams to multiple data streams. These machines run the gamut from simple master-slave coprocessor systems to extensive networks.

In one such architecture the CPUs are coupled to a bus and all traffic must travel on that bus. Consequently the bus becomes the system's limiting component as the number of processors grows. To alleviate such bus congestion a shared memory type of architecture is utilized. In this architecture the shared random access memory (RAM) usually has two ports, one of which connects to a local bus and the other to a system bus. This dual-bus hierachy architecture works best when the two kinds of data streams are reasonably balanced and the load distribution among processors does not require complex arbitration schemes. This balance is rarely achieved in practice and resort must be had to priority type architectures. Under this type architecture each processor requesting the bus must place their encoded priority on the bus which is then examined to find the highest priority request which is entitled to the bus. Once again as the number of processors gorws the system becomes slower and more complex.

At the other end of the spectrum from this autocratic type of multiprocessor environment is the egalitarian type. In an egalitarian system all processors are created equal. In an egalitarian system each machine has its own operating system which governs communications between computers through input/output channels. In-between these two extremes, the autocratic and the egalitarian architecture there are many shades, such as the well-known master/slave relationship which simplifies the resolution of conflicts, such as bus contention or priority assignment. One such type architecture, utilizing a combination of egalitarian and autocratic type architecture has multiple processors with each processor having its own operating system. These processors share a common memory and communicate with each other via a semophore mechanism. Additional multiprocessing architectures are described in a special report entitled "Multiprocessing Sytems", published in Electronic Design Magazine on Mar. 22, 1984.

The Honeywell microSystem 6/10 computer system adopted an architecture which was a novel combination of architectures described above and in the Electronic Design article. Basically it comprised an LSI-6 processor with its own MOD400 operaing system; an Intel type 8086 processor also having an independent operating system, such as the MSDOS or the CPM-86; and a Motorola 6809 processor. All these processors shared a common memory. Additionally the Motorola 6809 processor acted as an input/output (I/O) processor and had its own local memory. In order to eliminate much of the complexity of the type of architectures described supra, the microSystem 6/10 system was designed so that the Honeywall LSI-6 processor, which is a firmware based processor, would utilize 20-24% of the memory band width*; whereas the Intel 8086 processor, which was a slower software based machine, would utilize 70-74% of the memory band width. The Motorola processor (the I/O processor) having its own memory would utilize less than 1% of the memory band width of the shared processor. Accordingly in this architecture if there were no personal computer option (i.e. the Intel 8086 processor), the Honeywell LSI-6 processor would be under-utilized. This architecture was deliberately chosen so that the microSystem 6/10 system could have a personal computing option by adding the Intel 8086 CPU which could run commodity software with its MSDOS or CPM-86 operating system. Additionally the LSI-6 CPU, with its MOD400 or MOD200 operating system, or other operating systems, would simultaneously run software written for the Honeywell Level 6 Series. With this type of architecture the personal computer (Intel 8086) could utilize any memory cycles which the LSI-6 computer or the Motorola 6809 did not utilize. This would amount to approximately 75% of all memory cycles. This is a very synergistic type of mix of processes. This is accomplished by giving absolute memory utilization to the LSI-6. It is designed to use about 20-24% of the memory band width. If the LSI-6 wishes to use a memory cycle, he gets that cycle. If not, then that cycle is free for anyone else. The next-in-line would be the Motorola 6809 processor. However since its utilization is less than 1% of memory band width, the 8086 personal computer should utilize the bulk of the memory cycles. Because the 8086 processor cannot fully access the memory space reserved for the LSI-6, and because I/O operations are performed by the Motorola 6809 processor which can be requested directly only by the LSI-6 processor, communication is required between the 8086 and LSI-6 by messages transmitted through common memory. In order to synchronize this utilization of memory, a semaphore architecture is utilized. When the 8086 personal computer wants service (I/O transfer, etc.), it places a message in the semaphore; i.e., mailbox. In order to respond to requests for service from the 8086 personal computer, the LSI-6 computer has to monitor the semaphore/malibox to determine if a request is present and the type of request. The LSI-6 computer with standard programming techniques requires 500 μs and 150 memory accesses to check and test this semaphore/mailbox once. However the LSI-6 computer runs on a 649 ns cycle; thus checking for an event every 500 μs is not very efficient. Moreover utilization of 150 or more memory accesses by the LSI-6 computer cuts down on the memory band width available to the 8086 personal computer. In some instances the LSI-6 computer utilized over 90% of the memory band width although it was designed to utilize 20-24% of memory band width. Accordingly the personal computer could not run its programs with its operating system at full speed since it required at least 70-74% of the memory band width. What was needed, therefore, was a means of speeding up the monitoring of the semaphore so that the microSystem 6/10 system could operate under its uniquely designed architecture.

* Memory band width is the number of clock cycles available to perform a memory operation in a given amount of time.

OBJECTS OF THE INVENTION

It is a primary object of the invention to provide an improved digital computer system.

It is another object of the invention to provide an improved architecture for a digital computer system.

It is still a further object of the invention to provide an improved architecture for a computer system having two independent processors, each of which has its own operating system and can execute programs substantially concurrently utilizing its own operating system.

SUMMARY OF THE INVENTION

The architecture of the invention comprises at least two independent computers, each operating under its own operating system software and sharing a common memory. One computer is a personal computer type having an Intel 8086 CPU. The other computer is a Honeywell Level 6 type having an LSI-6 CPU. There is also an I/O processor (Motorola 6809). The Honeywell Level 6 machine is a firmware machine and therefore approximately three times faster than the personal computer machine, which is software driven. The Honeywell Level 6 computer has access to main memory at any time it desires. The 8086 processor takes the bulk of remaining cycles not required by the LSI-6 processor or the I/O processor. it does this through a hardware arbitration system. The LSI-6 polls the semaphore periodically and responds to the 8086 personal computer requests for service whenever it does not have other actions to perform. The polling of the semaphore which is in main memory requires such a great amount of time to access main memory that there is very little left over for the personal computer.

The invention, therefore, comprises a new combination of improved hardware and an improved firmware instruction for the Honeywell LSI-6 computer specifically designed to monitor the mailbox resulting in an improved, more efficient, architecture.

DESCRIPTION OF A PREFERRED EMBODIMENT

General Description

Figure 1:
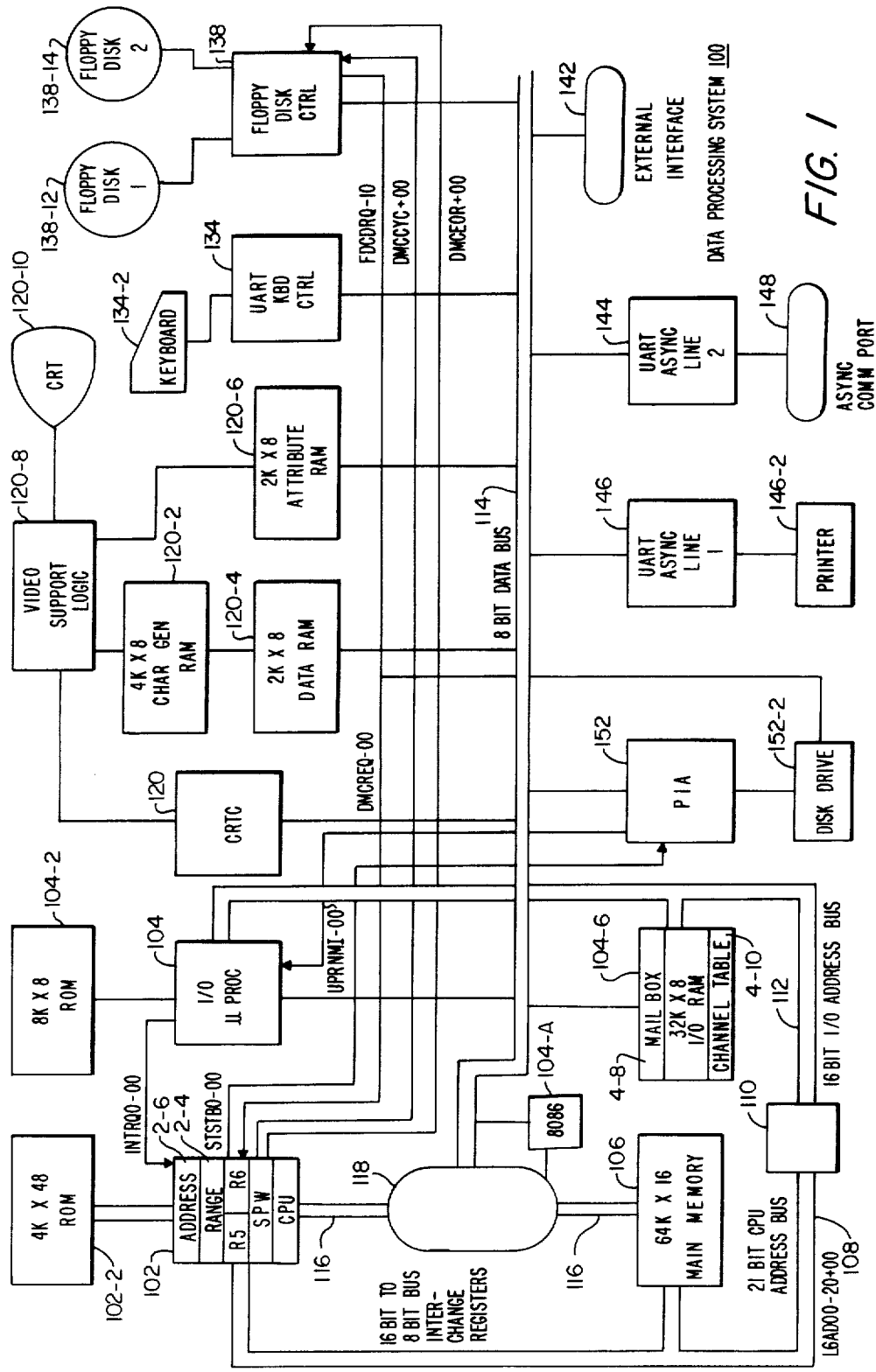
FIG. 1 is a high-level block diagram of the microSystems 6/10 computer system including a personal computer option.

Referring now to FIG. 1 there is shown an overall diagram of a data processing system 100, which includes a firmware-controlled central processing unit (CPU) 102 as an application processor and a I/O microprocessor 104 as an input/out processor. The CPU 102 is a Honeywell LSI-6 type which runs the Honeywell MOD200 or MOD400 operating system, or any other operating system. Systems applications are performed by the CPU 102 executing software programs stored in a 64K × 16-bit word main memory 106. The microprograms used by the CPU 102 to execute the software instructions are stored in a 4K × 48-bit word read only memory (ROM) 102-2.

Associated with the I/O microprocessor 104 are an 8K × 8-bit byte read only memory (ROM) 104-2 and a 32K × 8-bit byte random access memory (RAM) 104-6. The ROM 104-2 stores the firmware routines necessary for the start-up and initialization of the data processing system 100. The RAM 104-6 stores tables, communications control programs and firmware for emulating a universal asynchronous receive/transmit controller (UART) 144, firmware for controlling a number of devices including a keyboard 134-2 by means of a UART 134 by means of a floppy disk controller (FDC) 138, a printer 140-2 by means of a UART 146 and a cathode ray tube controller (CRTC) 120. The RAM 104-6 also includes a number of address locations, a "mailbox" which are used by the CPU 102 and I/O microprocessor 104 to communicate with each other.

CPU 102 and main memory 106 are coupled to each other by 21-bit address bus 108 and a 16-bit data bus 116. Data is transferred between CPU 102 and main memory 106 over data bus 116 from an address specified by CPU 102.

Data bus 116 is coupled to bus interchange registers 118. Also coupled to bus interchange registers 118 is an 8-bit data bus 114. Bus interchange registers 118 receive 16-bit data words from data bus 116 for transfer over data bus 114 as two 8-bit bytes, and also receive 8-bit bytes from data bus 114 for transfer over data bus 116. The I/O microprocessor 104, RAM 104-6, CRTC 120, UARTs 134, 144 and 146 and PDC 138 are coupled in common to data bus 114.

A 16-bit I/O address bus 112 is coupled to address bus 108 via a transciever 110 and also coupled to I/O microprocessor 104 and I/O RAM 104-6, thereby enabling both CPU 102 and I/O microprocessor 104 to address main memory 106 and RAM 104-6.

Also coupled to data bus 114 are a peripheral interface adapter 152 for controlling a disk drive 152-2, an asynchronous line UART for receiving and transmitting the data characters via an asynchronous port 148, a 2K × 8-bit word data random access memory (RAM) 120-4 for storing characters for display on a CRT 120-10 and a 2K × 8-bit word attribute random access memory (RAM) 120-6 for storing attribute characters. Attribute characters are used typically for such CRT 120-10 display functions as underlining characters or character fields for causing certain selected characters or character fields to blink or be displayed with higher intensity. Character codes stored in RAM 120-4 are applied to a 4K × 8-bit word character generator random access memory (RAM) 120-2 which generates the codes representative of the raster lines of data which display the characters on the face of the CRT 120-10. A video support logic 120-8 is coupled to the CRTC 120, character generator RAM 120-2 and attribute RAM 120-6 for generating the lines of characters on the face of the CRT 120-10.

The FDC 138 is typically an NEC MEW PD 765 single/double density floppy disk controller described in the NEC 1982 catalog, published by NEC Electronics U.S.A. Inc., Microcomputer Division, 1 Native Executive Park, Natick, Mass. 01760.

The I/O microprocessor 104 is typically a Motorola MC68B09 8-bit microprocessing unit. The PIC 152 is typically a Motorola MC68B21 peripheral interface adapter. The CRTC 120 is typically a Motorola MC68B45 CRT controller.

The I/O microprocessor 104, PIA 152 and CRTC 120 are described in the Motorola Microprocessor Data Manual, copyright 1981, by Motorola Semiconductor Products Inc., 3501 Bluestein Boulevard, Austin, Tex. 78721.

The UARTs 134, 144 and 146 are Synertics 2661 universal asynchronous receive/transmit controllers described in the Synertics MOS Microprocessor Data Processor Manual, copyright 1982, by Synertics Corporation, 811 East Arques Avenue, Sunnyvale, Calif. 94086.

The logic elements and firmware involved in the mass storage memory data transfer are known as the data multiplex control (DMC) facilities. The bus cycle during which the data is transferred is referred to as a DMC cycle. The microSystem 6/10 system and these configurations are more fully described in United States patent application Ser. No. 503,963, filed on June 13, 1983, entitled "Direct Multiplex Control Facility" and assigned to the same assignee as the instant invention.

Figure 2:
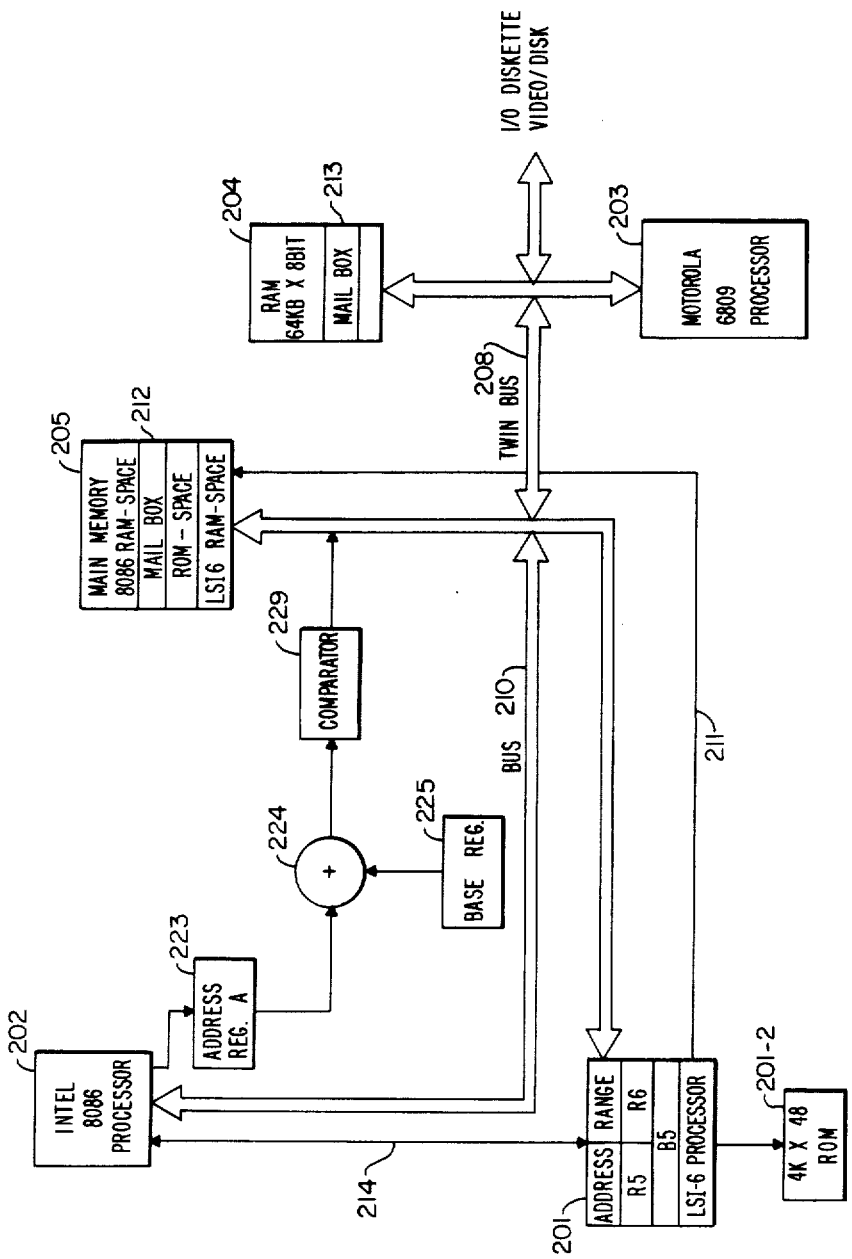
FIG. 2 is a high-level block diagram of the invention.

Referring now to FIG. 2 there is shown a block diagram of the architecture of the invention. The basic Honeywell microSystem 6/10 system without an 8086 personal computer option comprises a main memory 205 which can be accessed by a Honeywell LSI-6 processor 201 and a Motorola 6809 type processor 203. Also coupled to the Motorola 6809 type processor is a random access memory (RAM) 204. Since the LSI-6 processor is a 16-bit processor, the random access memory 205 is coupled to it via a 16-bit bus 211. The Motorola 6809 processor being an 8-bit machine and also the RAM 204 being 8 bits wide is coupled to the main memory 205 via a twin bus which is comprised of two 8-bit type busses. Accordingly the LSI-6 processor 201 can access main memory 205 and RAM 204; and also the Motorola type 6809 processor 203 can access main memory 205 and RAM 204. This system comprised of the LSI-6 processor 201, main memory 205, RAM 204 and Motorola 6809 type processor 203 is the basic microSystem 6/10 system. It is firmware driven and accordingly very fast utilizing only about 20-25% of the available memory cycles of main memory 205; i.e., it has a 25% memory band width. The LSI-6 processor 201 is the workhorse of the computer system. It operates under a Honeywell MOD400 or MOD200 operating system, or any other operating system, and executes user programs compatible with these operating systems. On the other hand, the Motorola 6809 type processor 203 operates as an input/out processor utilizing its local memory 204, 99% of the time. It is designed to have access to main memory 205 when the LSI-6 processor 201 is not utilizing main memory 205. This access to main memory amounts to about 1% of the available main memory cycles.

It can readily be seen that this type of architecture described supra, is ideal for adding a personal computing option, such as an IBM or Apple personal computer, that can substantially concurrently execute commodity type software. In the principal embodiment of the invention an Intel 8086 type microprocessor 202 is coupled to main memory 205 via bus 210. The Intel 8086 processor 202 can utilize an MSDOS or CPM-86 operating system which can execute commodity software written for the IBM personal computer. Accordingly the microSystem 6/10 system has the IBM personal computer emulator board as an add-on option. As previously described the 8086 processor 202, being software driven, is much slower and requires approximately 70-75% of the main memory cycles. It is imperative, therefore, if each of the processors 201, 202 and 203 are to operate independently and concurrently on their own operating systems and execute independent user programs that the relationship regarding the main memory band width requirements of each processor be maintained. In addition to this requirement, each processor 201 and 202 must have its own allocated memory space in main memory 205. This is achieved by utilizing an address register A 223 together with a base register 225 coupled to an adder 224 and a comparator 229. The base register stores an offset which is added to the address from the 8086 processor 202 stored in address register A 223 via adder 224. Accordingly all addresses requested of main memory by Intel 8086 processor 202 will begin at a predetermined offset from the base of main memory 205. A comparator 229 ascertains that the predetermined boundaries of the RAM space allocated to each processor is not exceeded. Since LSI-6 processor 201 requests addresses directly to the memory and are not offset, each processor 201 and 202 will have its own working space in main memory 205. Additionally a ROM space below the base of 8086 memory 205 has been provided for. This ROM space is addressed by negative addresses from 8086 processor 202. In this space data can only be read out from main memory 205 by 8086, but cannot be written into this area during execution. Accordingly this space stores read only programs such as BIOS for the 8086 processor 202. Although the Intel 8086 type processor 202 cannot access the memory space reserved for the LSI-6 processor 201, becuase of the boundaries set up via comparator 229, the LSI-6 processor, on the other hand, is not inhibited in that way and accordingly can access main memory space 205 in any area including the 8086. Therefore, in order for the 8086 type processor 202 to communicate with the LIS-6 processor 201, a semaphore/mailbox 212 is provided in the RAM space reserved for 8086 processor 202. Access to the RAM memory 204 and to other peripherals, such as USARTs, diskettes, etc. is made via a program executing in the LSI-6 processor 201. The LSI-6 processor 201 via a firmware routine located in 201-2 utilizes mailbox 212 for addressing the physical devices, such as the ones mentioned supra, rather than addressing them directly. Since, however, this aspect of the system is not pertinent to the invention, it will not be described further.

Mailbox 212, however, is utilized in communicating between processors 201 and 202. In operation, the LSI-6 processor is responsible for initiating input/output (I/O) operations. Accordingly when the Intel 8086 type processor 202 wishes to access an I/O device, it is necessary to send a message in mailbox 212. Under normal operation the LSI-6 processor 201 monitors mailbox 212 and initiates service to 8086 as requested. The problem as seen earlier was that the monitoring operation consumed so many of the memory cycles that not many were left over for the Intel 8086 processor 202. The instant invention improves the microSystem 6/10.

Description of a Preferred Embodiment of the Invention

Figure 3:
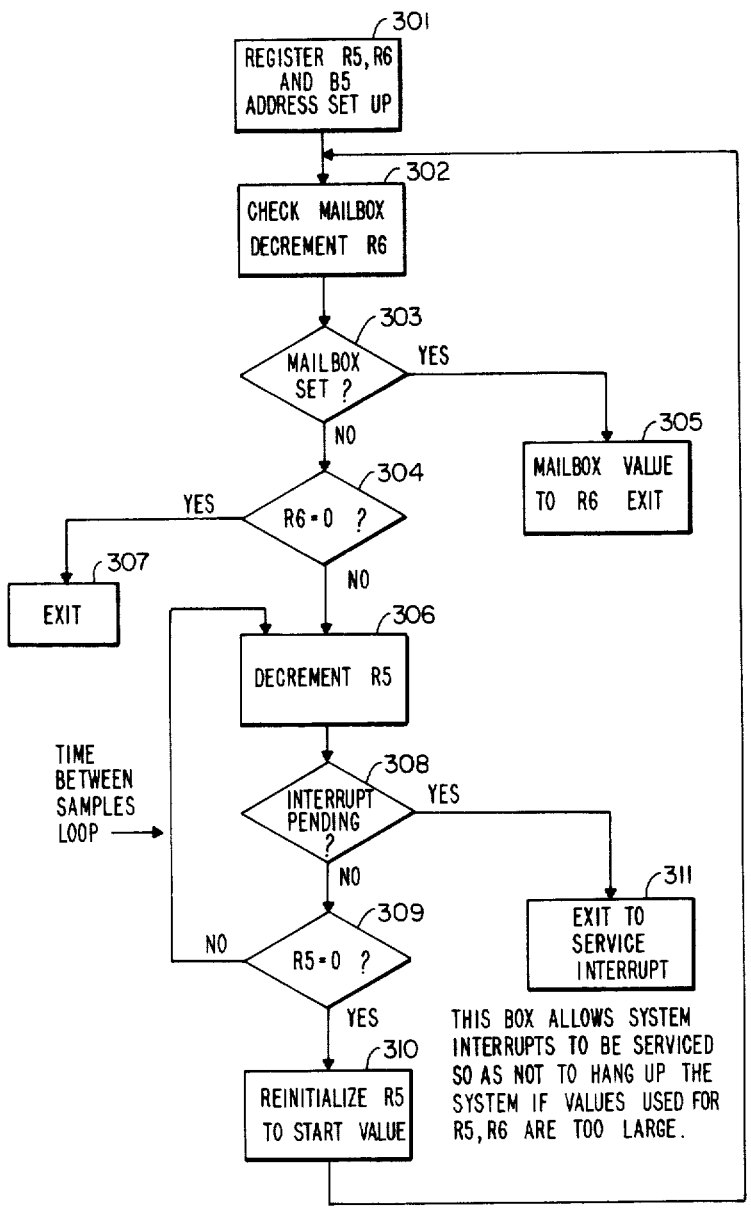
FIG. 3 is a flowchart of the operations of a firmware instruction implemented in firmware for use in combination with the computer system of FIG. 2.

In order to solve this problem of continuously polling the semaphore, a new firmware instruction was developed and new hardware was added. Referring to FIG. 3 there is shown a flowchart of the machine operations performed by this instruction. Three parameters are first passed to internal registers of the LSI-6, R5, R6 and B5. Register R5 contains a value which is the amount of time between successive sampling by the instruction. If samples are taken too quickly, there is not sufficient time for the 8086 to do much of any other work. Register R6 stores the number of samples to be made by the instruction before attending to other matters. In this way it is not necessary for the instruction to continually re-execute in a software loop which utilizes a lot of bus cycles. Register B5 specifies the location of the mailbox.

Box 301 is the operation for register save and set up. Registers R5 and R6 are loaded from internal registers of the microSystem 6/10 and the mailbox address is set up in an address register 221 B. After the initial register values are saved, the mailbox (i.e. semaphore) is checked, and the contents of Register R6 is decremented. Box 303 indicates that a test must be performed in order to see whether the mailbox semaphore is set. The test is to read the mailbox and check if the contents of a particular address (specified by register B5) contains a non-zero valve (212).

If it is equal to non-zero ($\neq 0$), the value contained in the mailbox is placed into register R6 and the instruction is exited. If it is not equal to 0, the count in register R6 is checked to see whether it is equal to 0(R6)—box 304. If R6 equals 0, the instruction is exited—box 307. If R6 is not equal to 0 ($\neq 0$), another sample must be taken. Accordingly a timing loop is entered, starting with box 306. This loop first decrements register R5, which is the time delay, then it tests to determine if there is an interrupt pending 308; in other words, an I/O request from the 6809 has priority. If there is no interrupt pending, register R5 is checked to see whether its contents are equal to 0, 309. If it is not equal to 0, the loop returns to box 306 and starts its three box cycle over again. When register R5 reaches 0, there is a branch to box 310 where register R5 is re-initialized to its original value, i.e. the original period of time value; then there is a jump back to box 302 where the process is started over again checking the mailbox and decrementing R6.

When the instruction is exited, there are three values which may be in R6. If R6 equals 0, that means the sample count ran out and no service was requested by the 8086. Software can then do what ever it pleases, usually it will re-initialize the instruction. If R6 equals all FFs or just a non-zero value, that means that service was requested and software then goes on to interrogate the 8086 to determine what it wanted to do with the I/O.

The following equations describe the time required to execute the instuction:

$$((R5*2)+10) * 0.649 = \text{Time between samples in usec.} \quad (1)$$

$$18 + R6*[(R5*2)+10]* 0.649 = \text{Total time to execute the instruction.} \quad (2)$$

The time between samples is given in equation 1, and provides a predetermined value to be placed in R5 to figure out how much time is desired between samples. Equation 2 will provide the total time to execute the instruction. As an example, if R6 equals 1 and R5 equals 2, the total instruction time is 29.9 microseconds, and the time between samples is 9.1 microseconds. Now it can be seen that in 29.9 microseconds the same result is accomplished that required 500 microseconds previously. Additionally, for each sample, 150 memory cycles were required with the prior art and only about 4 memory cycles with the invention.

It can readily be seen that by adjusting the time that the CPU spends in the instruction before exiting, other work can be performed by the 8086 with minimal interference from the LSI-6. Also another major feature is that as many mailboxes as desired can be monitored simply by changing the address contained in B5. Moreover communications need not be limited between processors, as shown in the example supra, but includes communciations between concurrent tasks operating on the LSI-6.

Having described a preferred embodiment of the invention, those skilled in the art will realize that many variations and modifications may be made to affect the described invention and still be within the scope of the claimed invention. It is the intention, therefore, to limit the invention only as indicated by the scope of the claims.

What is claimed is:

1. A semaphore arrangement for use in a computer system to indicate availability of a system resource, said semaphore arrangement comprised of:
   (a) a bus;
   (b) a main memory having a predetermined bandwidth coupled to said bus;
   (c) a first and second processor coupled to said bus, said first processor operating under a first operating system and said second processor operating under a second operating system, said first and second processors communicating with each other and with said main memory via said bus;
   (d) a semaphore connected to said bus and responsive to said first processor for indicating to said second processor when said main memory is not being utilized by said first processor;
   (e) first means for storing information indicating a time period for sequentially checking said semaphore with said second processor;
   (f) second means for storing information indicating the number of times said semaphore is to be checked by said second processor before checking is temporarily halted to be restarted at a later time when said second processor is idle,
   said second processor being responsive to said information stored in said first storing means and said second storing means to check the contents of said semaphore said number of times to determine when said main memory is idle and available to be used by said processor, said period and said number of times being selected to increase the amount of time said second processor has to perform other processing tasks.

2. The computer system as recited in claim 1 wherein said first processor is firmware driven and said second processor is software driven and wherein said second processor utilizes at least eighty percent of the available memory band-width.

3. The computer system as recited in claim 2 including a third processor coupled to said bus and operating under a third operating system, said third processor also operating substantially concurrently and independently of said first and second processor, said third processor dedicated for performing input/output (I/O) operations for the computer system.

4. A signaling arrangement for use in a computer system to indicate availability of a system resource, said signaling arrangement comprised of:
   (a) a bus;
   (b) a main memory having a predetermined band-width coupled to said bus;
   (c) a plurality of processors coupled to said bus and communicating with said main memory via said bus, each of said plurality of processors operating under its own operating system, and wherein one of said processors utilizes eighty percent of the memory band-width;
   (d) mailbox means connected to said bus and accessed by said processors to store information indicating the availability of said main memory by ones of said processors;
   (e) firmware instruction means for sampling the information stored in said mailbox means;
   (f) first means for storing information indicating a time period for sequentially checking said mailbox means with one of said processors;
   (g) second means for storing information indicating the number of times said mailbox means is to be checked by each of said processors before checking is temporarily halted to be restarted at a later time when said processors are idle; and
   said processors being responsive to said information stored in said first storing means and in said second storing means to check the contents of said mailbox means said number of times to determine when said main memory is idle and available to be used by one of said processors, said period and said number of times being selected to increase the amount of time said processors have to perform other processing tasks.

5. The computer system as recited in claim 4 including third means for storing the address of the mailbox means.

* * * * *